Sept. 23, 1941.   W. L. SMITH, JR   2,256,690
KNITTED FABRIC AND METHOD
Filed June 3, 1939   2 Sheets-Sheet 1
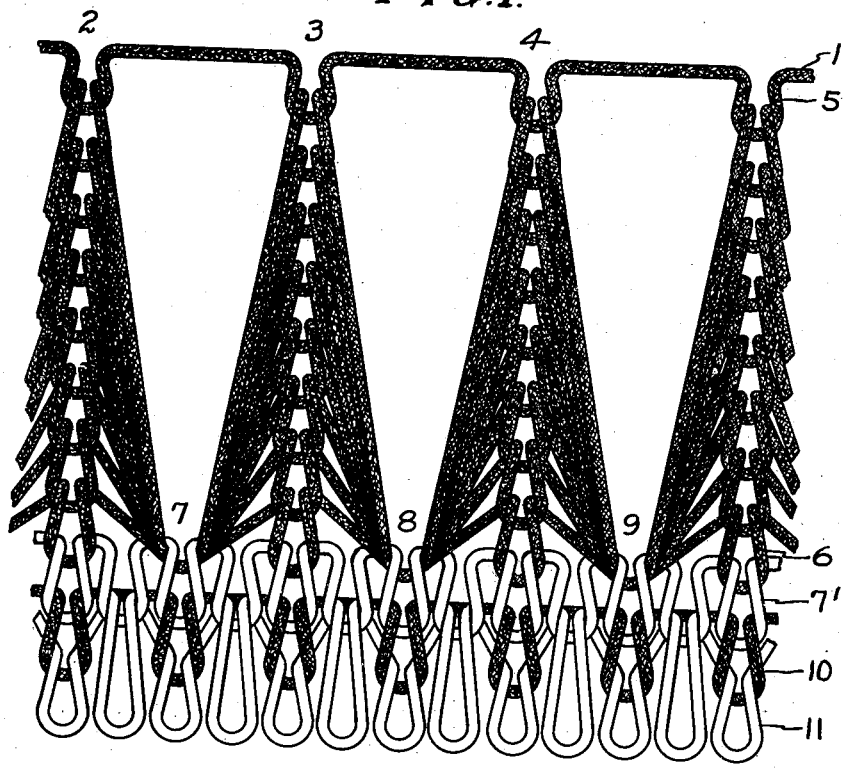
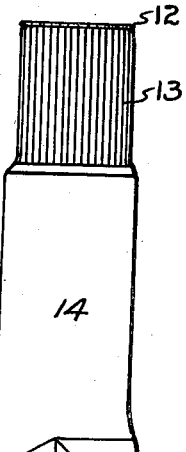
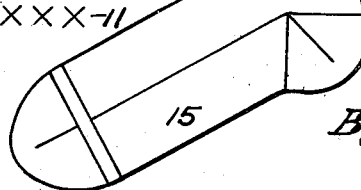
INVENTOR:
WILLIAM L. SMITH JR.
By Roy F. Lovell
ATT'Y.

Sept. 23, 1941. W. L. SMITH, JR 2,256,690
KNITTED FABRIC AND METHOD
Filed June 3, 1939 2 Sheets-Sheet 2
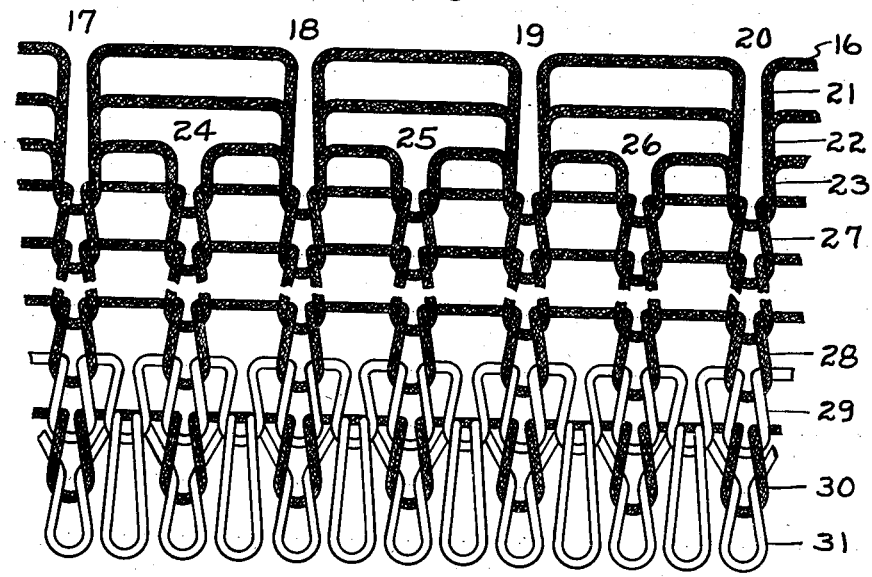
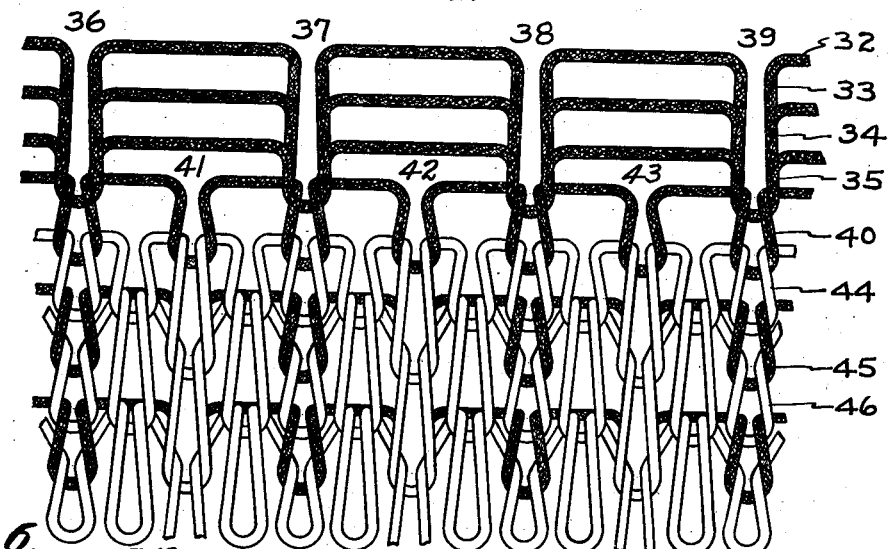
INVENTOR:
WILLIAM L. SMITH JR,
By Roy F. Lovell
ATT'Y.

Patented Sept. 23, 1941

2,256,690

UNITED STATES PATENT OFFICE 2,256,690

KNITTED FABRIC AND METHOD

William L. Smith, Jr., Pawtucket, R. I., assignor to Hemphill Company, Central Falls, R. I., a corporation of Massachusetts Application June 3, 1939, Serial No. 277,225

8 Claims. (Cl. 66—172)

This case involves knitting beginning edges or selvages wherein elastic yarn is incorporated to form the selvage and also to prevent rolling of the fabric. Each of the selvages herein described includes a bead at the edge of the fabric which contributes to the appearance, resistance against curling, and to the general strength of the fabric at that point.

In the figures of drawings:

Fig. 1 is a conventional view showing the stitch structure of a section of fabric according to one form of the invention;

Fig. 2 is a diagrammatic view showing stitches, tuck and float work to knit the fabric of Fig. 1;

Fig. 3 is a conventional illustration of a stocking having an elastic top wherein a selvage of the type described in this case may be employed;

Fig. 4 is a section through a part of the top of such a stocking showing the manner in which the edge forms a bead;

Fig. 5 shows conventionally the stitch structure in a modified form of the invention;

Fig. 6 is a diagrammatic view similar to Fig. 2 showing the knitting process employed to knit the fabric of Fig. 5;

Fig. 7 is a view conventionally showing stitch structure of a third form of the invention; and Fig. 8 is a diagrammatic view showing the knitting process according to Fig. 7.

Fabrics illustrated herein are of that general type employed for elastic hosiery tops wherein an elastic yarn is incorporated in a plain knit fabric to simulate a rib appearance and to impart that degree of elasticity desirable in a hosiery garter. Preferably, although not necessarily, the fabrics to which each of the selvages apply may be of the type disclosed and claimed in St. Pierre Patent No. 2,131,720.

Referring to Fig. 1, an elastic yarn 1 is shown being knitted at every fourth wale in the initial course. This elastic yarn is thus knitted by needles knitting the wales designated at 2, 3 and 4. Only a small section of the fabric is shown in this Fig. 1, but it is to be understood that the same applies throughout the entire edge of the stocking top or article under consideration. Throughout the succeeding courses from the course indicated at 5 down to the last course in the selvage knitted from elastic only, numbered 6, the said elastic yarn continues to be taken by every fourth needle and knitted in each of those courses at the particular wales 2, 3, 4, etc. However, intermediate needles knitting in wales 7, 8 and 9 take the elastic yarn beginning with the next course after the initial course 5. These needles do not cast off that elastic yarn but accumulate the same, tucking as illustrated and thus accumulating a great number of stitches, the number actually depending upon the number of courses from the initial course down to the course 6. It is to be understood that the number of courses may vary, that herein shown merely being illustrative of what has been found to be quite satisfactory from a practical point of view. After the last course of elastic has been taken by the needles, the next course numbered 7' will be a course of plain (not-elastic) yarn knitted on all needles. This yarn will draw through the last drawn loops in wales 2, 3, 4, etc., and also through the accumulated loops in wales 7, 8, 9, etc.

At this point the selvage is completed and further fabric may be knitted in any desired manner having elastic yarn incorporated or possibly not having elastic yarn. Preferably the continuing fabric will be knitted with elastic incorporated in at least some of the courses so as to impart a simulated rib appearance and to contract the fabric to give it that elasticity which is desired. In the particular example herein shown, the fabric continues in accordance with that shown in United States Patent No. 2,131,720, having the elastic yarn knitted in alternate wales in course 10 while the plain yarn is knitted on all needles in course 11. It is to be understood that other fabrics such as those having an elastic yarn knitted in conjunction with a non-elastic yarn at spaced wales, or alternatively laid in at spaced wales, may be knitted in continuation of the selvage, the elastic appearing in all courses or in spaced courses as desired.

In Fig. 2 a diagrammatic showing has been made in which x's represent stitches, circles represent floats, that is, places at which the yarn is not taken at all, and triangles are used to indicate individual tuck stitches or places in the fabric at which yarn is taken and retained on a needle in contrast to being knitted or cast off. Similar numerals are applied to the wales and courses in Fig. 2 as applied to Fig. 1. From these it is easy to follow the knitting process from course to course.

The plurality of courses knitted in the selvage and in which an extremely great number of accumulated elastic stitches are knitted off as tuck stitches result in immediate contraction of that part of the fabric and a rolling of those courses into a very pronounced bead which is of greater vertical extent than width. Such bead is indicated in Fig. 4 by numeral 12. In Fig. 3 that bead 12 is shown at the beginning edge of an elastic top 13 on a conventional half hose having a leg 14 and foot 15. Other than at the edge such stocking may be of any type as usually employed, such as anklets, half hose or children's or ladies' wear. Now referring to Figs. 5 and 6, a second form of the invention is shown wherein an elastic yarn 16 is fed to every fourth needle or in wales 17, 18, 19 and 20 in courses 21 and 22. This elastic yarn is merely accumulated in hooks of needles, that is, hooks are loaded with the elastic for the two courses mentioned. Then on the third course 23 the elastic yarn is again taken in the hooks of needles which knit wales 17, 18, 19 and 20, and also in the hooks of those needles which knit intermediate wales 24, 25 and 26. At this time every fourth needle will have three loops of elastic yarn in its hook while the intermediate needles will have a single loop of elastic yarn in their hooks. On the next course 27 said yarn is taken in the hooks of alternate needles, that is, those knitting wales 17, 18, 19, 20 and also wales 24, 25 and 26, etc., and knits. By that it is meant that individual loops of that elastic yarn will at that time draw through the accumulated loops and single loops which were previously on the needles. Thereafter a plurality of courses which may be generally sufficient to make a bead of desired strength and size at the edge of the fabric, will be knitted as in course 27, elastic fabric thus extending from that course to the last course knitted and indicated at 28. The next course drawn will be of non-elastic yarn knitting on all needles as shown at 29. Thereafter courses 30 and 31 are knitted similarly to courses 10 and 11 described with respect to Fig. 1. Other schemes may be employed following course 29, all as stated above.

The knitting for this form of the invention is also diagrammatically shown in Fig. 6. Therein like wales and courses are indicated by like numerals employed in Fig. 5. The legend is the same.

Now referring to Figs. 7 and 8 a third form of the invention is shown wherein an elastic yarn 32 is taken at courses 33, 34 and 35 in the hooks of every fourth needle. That means that the yarn is tucked or accumulated on these needles or in wales 36, 37, 38 and 39. In the next course 40 the elastic yarn is taken in alternate needles and is actually drawn as stitches through those accumulated loops just mentioned. In addition to knitting in wales 36—39, the yarn also knits in intermediate wales 41, 42 and 43. The next course 44 is of plain or non-elastic yarn and constitutes loops drawn at each wale. On the next course 45 the elastic yarn is taken by alternate needles, being knitted through the last drawn plain yarn stitches in every fourth wale, but merely being taken in the hooks of needles in addition to the yarn previously held on the intermediate needles or in wales 41, 42, 43, etc. In the next course 46 plain yarn is taken at all of the needles and is knitted through the last drawn loops on those needles. That means that in every fourth wale as they are herein designated, the plain yarn would draw through the last drawn elastic stitches; in intermediate wales as 41—43, plain yarn will be drawn through a tuck stitch comprised of a plain and an elastic yarn, while in the remaining wales in which no elastic is drawn at all, plain yarn would merely be knitted through the plain yarn drawn at the course 44. This may continue throughout the remainder of the fabric in which the elastic is to be incorporated.

In Fig. 8 the knitting is shown diagrammatically as in previous Figs. 2 and 6, reference numerals being employed to indicate the appropriate wales and courses, all in accordance with numerals appearing on Fig. 7.

The fabric knitted in continuation of the selvage according to the modification of Fig. 7 is slightly different from that in Figs. 1 or 5. It is to be understood that these fabrics and selvages are interchangeable and that each selvage herein disclosed has its advantages of forming a bead when being released from the machine which is effective in preventing curl at the edge of the fabric. The bead has a substantial appearance in each instance and adds greatly to the strength of the fabric at that position, certain selvages heretofore employed being rather weak both physically and from the point of appearance, the latter being important in that a more salable article results when that apparent weakness is eliminated.

In making each of these selvages it is preferable to feed the elastic yarn at one side of a two feed machine. Plain yarn may be fed at a separate feed, normally the so-called main or regular feed as understood in a hosiery machine. The elastic will be controlled to feed at desired times and needle selection of any known type may be resorted to for first presenting every fourth needle to take the elastic yarn and thereafter, every other needle. Such machine is well-known to those skilled in the art and a complete description will not be given here. The invention is not to be limited otherwise than by the scope of the appended claims.

I claim:

1. A selvage for a knitted fabric having a plurality of courses knitted from an elastic yarn only, said elastic yarn being so knitted in some wales to constitute tuck stitches having a relatively great number of accumulated loops of elastic yarn, and in other wales, knitted elastic yarn loops, said yarn being knitted under tension so it will contract and roll into a bead at the edge of the fabric.

2. A selvage for knitted fabrics having a plurality of courses knitted from an elastic yarn, said elastic yarn being knitted at each course in spaced wales and being tucked over a relatively great number of courses in intervening wales, said yarn being knitted under tension so it will contract and roll into a bead at the edge of the fabric.

3. A selvage for knitted fabrics having a plurality of courses knitted from an elastic yarn, said yarn being knitted at each course in every fourth wale and being tucked over the entire plurality of elastic yarn courses in intermediate wales, said yarn being knitted under tension so it will contract and roll into a bead at the edge of the fabric.

4. A selvage for knitted fabrics having a plurality of courses knitted from an elastic yarn, said elastic yarn being knitted in every fourth wale only for the first course, then for a plurality of courses being knitted at each course in said fourth wales while being tucked at intermediate wales and thereafter being knitted off as a course of non-elastic yarn is drawn into knitted stitches in every wale of the fabric.

5. A selvage for a knitted fabric having an elastic yarn knitted over a plurality of courses, said elastic yarn being accumulated as tuck stitches in every fourth wale for a plurality of courses, then being taken at every other wale for a course and thereafter being knitted at every other wale to a course in which a non-elastic yarn is drawn into knitted stitches at every wale of the fabric.

6. A selvage for a knitted fabric having a plurality of courses knitted from an elastic yarn, said elastic yarn being accumulated as tuck stitches in every fourth wale for a relatively great number of courses and thereafter being knitted at every other wale whereupon a non-elastic yarn is drawn into knitted stitches at every wale of the fabric to complete a selvage.

7. A method of knitting a selvage at the start of a knitted fabric including the steps of drawing an elastic yarn under tension into knitted stitches over a relatively great number of courses and tucking said yarn at spaced wales throughout the entire extent of the selvage thus knitted from elastic yarn so that the yarn will contract when released and will roll upon itself to form a bead.

8. A method of knitting a selvage including the steps of feeding elastic yarn and knitting the same so that at every fourth wale for a number of courses the elastic will be independently knitted to form a series of interlocking stitches, and at intermediate wales between said fourth wales, the said elastic yarn will be accumulated and drawn into extended tuck stitches, said yarn being drawn under tension so that upon being released it will contract and the courses thus knitted and tucked will roll upon themselves to form a compact bead.

WILLIAM L. SMITH, Jr.